(12) United States Patent
Jung et al.

(10) Patent No.: US 9,424,466 B2
(45) Date of Patent: Aug. 23, 2016

(54) SHOE IMAGE RETRIEVAL APPARATUS AND METHOD USING MATCHING PAIR

(71) Applicant: Electronics and Telecommunications Research Institute, Daejeon (KR)

(72) Inventors: Da Un Jung, Daejeon (KR); Seung Jae Lee, Daejeon (KR); Sung Kwan Je, Daejeon (KR); Keun Dong Lee, Daejeon (KR); Sang Il Na, Daejeon (KR); Weon Geun Oh, Daejeon (KR); Young Ho Suh, Daejeon (KR); Wook Ho Son, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 135 days.

(21) Appl. No.: 14/337,001

(22) Filed: Jul. 21, 2014

(65) Prior Publication Data

US 2015/0139555 A1 May 21, 2015

(30) Foreign Application Priority Data

Nov. 19, 2013 (KR) ........................ 10-2013-0140791

(51) Int. Cl.
*G06K 9/00* (2006.01)
*G06K 9/52* (2006.01)
*G06K 9/62* (2006.01)
*G06F 17/30* (2006.01)
*G06Q 30/06* (2012.01)

(52) U.S. Cl.
CPC ...... *G06K 9/00523* (2013.01); *G06F 17/30256* (2013.01); *G06K 9/00362* (2013.01); *G06K 9/00536* (2013.01); *G06Q 30/0621* (2013.01); *G06K 2009/6213* (2013.01)

(58) Field of Classification Search
USPC .......................................... 382/206, 111, 225
See application file for complete search history.

(56) References Cited

U.S. PATENT DOCUMENTS

| | | | | |
|---|---|---|---|---|
| 7,751,621 | B1* | 7/2010 | Jacobsen | G06K 9/4647 382/173 |
| 7,949,191 | B1* | 5/2011 | Ramkumar | G06K 9/723 382/190 |
| 8,401,342 | B2* | 3/2013 | Ruzon | G06T 7/0028 382/181 |
| 8,880,563 | B2* | 11/2014 | Lin | G06F 17/30259 382/128 |
| 8,942,468 | B1* | 1/2015 | Toshev | G06K 9/4638 382/100 |
| 8,954,358 | B1* | 2/2015 | Zhang | G06K 9/6292 382/225 |
| 2005/0078881 | A1* | 4/2005 | Xu | G06K 9/6211 382/294 |

(Continued)

*Primary Examiner* — Kathleen Y Dulaney

(57) ABSTRACT

Provided are a shoe image retrieval apparatus and method using a matching pair, which can accurately retrieve image information corresponding to an inputted image from the database and provide the retrieved image information, by normalizing a correspondence relation in consideration of geometric image transformation about the matching pair and allowing a similar image to be retrieved by applying the normalized correspondence relation. It is possible to detect optimum geometric image transformation from a matching pair between the inputted shoe image and the image stored in the database and simultaneously retrieve a plurality of objects in the inputted shoe image based on the detected geometric image transformation, thereby providing an efficient shoe retrieval service.

19 Claims, 6 Drawing Sheets

(56) References Cited

U.S. PATENT DOCUMENTS

| | | | | |
|---|---|---|---|---|
| 2009/0232361 A1* | 9/2009 | Miller | ................... | G06K 9/6293 382/115 |
| 2009/0324087 A1* | 12/2009 | Kletter | ................... | G06K 9/4671 382/195 |
| 2012/0121132 A1* | 5/2012 | Asahara | ................... | G06K 9/00201 382/103 |
| 2012/0177295 A1* | 7/2012 | Gronau | ................... | G06K 9/03 382/218 |
| 2012/0183224 A1* | 7/2012 | Kirsch | ................... | G06K 9/4619 382/195 |
| 2012/0269429 A1 | 10/2012 | Lee et al. | | |
| 2013/0004079 A1* | 1/2013 | Yamada | ................... | G06K 9/4642 382/190 |
| 2013/0039566 A1* | 2/2013 | Reznick | ................... | G06T 9/005 382/154 |
| 2013/0121558 A1* | 5/2013 | Jin | ................... | G06T 7/20 382/154 |
| 2013/0243341 A1* | 9/2013 | Iakovenko | ................... | G06K 9/4671 382/218 |
| 2013/0308860 A1* | 11/2013 | Mainali | ................... | G06K 9/4671 382/170 |
| 2013/0315490 A1* | 11/2013 | Akiyama | ................... | G06K 9/46 382/201 |
| 2014/0093156 A1* | 4/2014 | Gawne | ................... | G06K 9/6292 382/137 |
| 2014/0147023 A1* | 5/2014 | Lee | ................... | G06K 9/00288 382/118 |
| 2014/0270541 A1* | 9/2014 | Lee | ................... | G06K 9/4676 382/201 |

* cited by examiner

- 210 — CORRESPONDENCE RELATION GENERATION UNIT
- 220 — GEOMETRIC IMAGE TRANSFORMATION MODELING UNIT
- 230 — CANDIDATE FEATURE POINT DETECTION UNIT
- 240 — MATCHING DATA CLASSIFICATION UNIT

SHOE IMAGE RETRIEVAL APPARATUS AND METHOD USING MATCHING PAIR

CROSS-REFERENCE TO RELATED APPLICATIONS

This application claims priority under 35 U.S.C. §119 to Korean Patent Application No. 10-2013-0140791, filed on Nov. 19, 2013, the disclosure of which is incorporated herein by reference in its entirety.

TECHNICAL FIELD

The present invention relates to a shoe image retrieval apparatus and method using a matching pair, and more particularly, to an apparatus and method for retrieving a shoe image using information on a matching pair.

BACKGROUND

The related art shoe retrieval systems provide a service with enhanced user convenience to a user. Specifically, as online shopping malls are showing a steady and high growth rate, the shoe retrieval systems may quickly retrieve a product desired by a user from a product database (hereinafter, referred to as DB) and provide the product to the user.

In addition, smart equipment such as a smart phone, a tablet, a smart TV, a PC, etc., which has been widely used in recent years, provides an enhanced service for assisting consumer purchase decision-making.

Flow, Fabulous, etc. of Amazon (a9.com) are representative shoe retrieval systems, which are currently being serviced.

The related art shoe retrieval systems provide a service for sufficiently accommodating various requirements of users to filter inquired products according to predetermined conditions such as color and type in addition to a service for providing basic information on the inquired products such as product comments, prices, related links, and so on.

In addition, the related art shoe retrieval systems also provide a service for accurately and quickly retrieving a product desired by a user by adding a image retrieval function.

That is, when a shoe are photographed with a built-in camera in smart equipment of a user and the image of the photographed shoe is inputted, the related art shoe retrieval systems retrieve a shoe image most similar to the inputted shoe image from the DB and provide a service for displaying the retrieved shoe image on a screen of the smart equipment of the user.

Accordingly, the user may check information on shoes desired to be purchased, in real time.

However, the related art shoe retrieval system with an added image retrieval function considers only geometric information when comparing the image stored in the DB with the image photographed by the user. Thus it is impossible to accommodate all variations of the object to provide an accurate retrieval result obtained by reflecting image variations such as brightness, size, and rotation, and it is possible to generate an error in a matching stage when a plurality of the same shoes are included in the photographed image or a pair of objects have different geometric variations.

SUMMARY

Accordingly, the present invention provides a shoe image retrieval apparatus and method using a matching pair, which can accurately retrieve image information corresponding to an input image from the database and provide the retrieved image information, by normalizing a correspondence relation in consideration of geometric image transformation corresponding to the matching pair and allowing a similar image to be retrieved by applying the normalized correspondence relation.

In one general aspect, a shoe image retrieval apparatus using a matching pair includes: a matching region search unit configured to extract features from a query image and search a matching region based on the extracted features; a matching information detection unit configured to detect geometric image transformation on a matching pair between the searched matching region and an image stored in a database; and a similar image retrieval unit configured to retrieve image information corresponding to the query image from the database based on the detected geometric image transformation.

In another general aspect, a shoe image retrieval method using a matching pair includes: extracting features from a query image and searching a matching region based on the extracted features; detecting geometric image transformation on a matching pair between the searched matching region and an image stored in a database; and retrieving image information corresponding to the query image from the database based on the geometric image transformation.

Other features and aspects will be apparent from the following detailed description, the drawings, and the claims.

DETAILED DESCRIPTION OF EMBODIMENTS

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
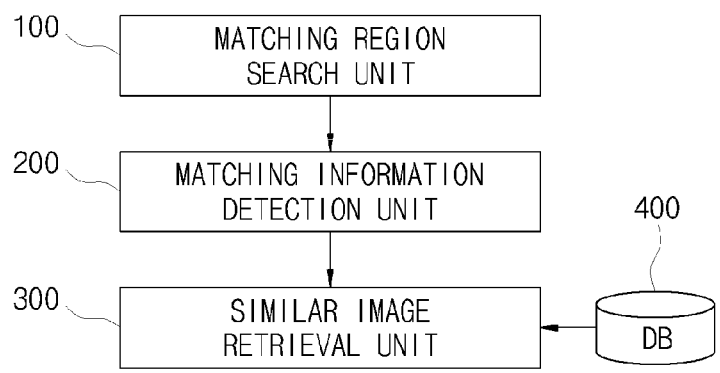
FIG. 1 is a view illustrating a shoe image retrieval apparatus using a matching pair according to an embodiment of the present invention.
Figure 3:
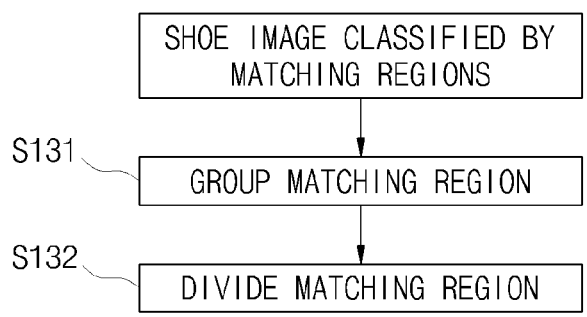
FIG. 3 is a view illustrating a method of identifying a matching pair region.
Figure 4:
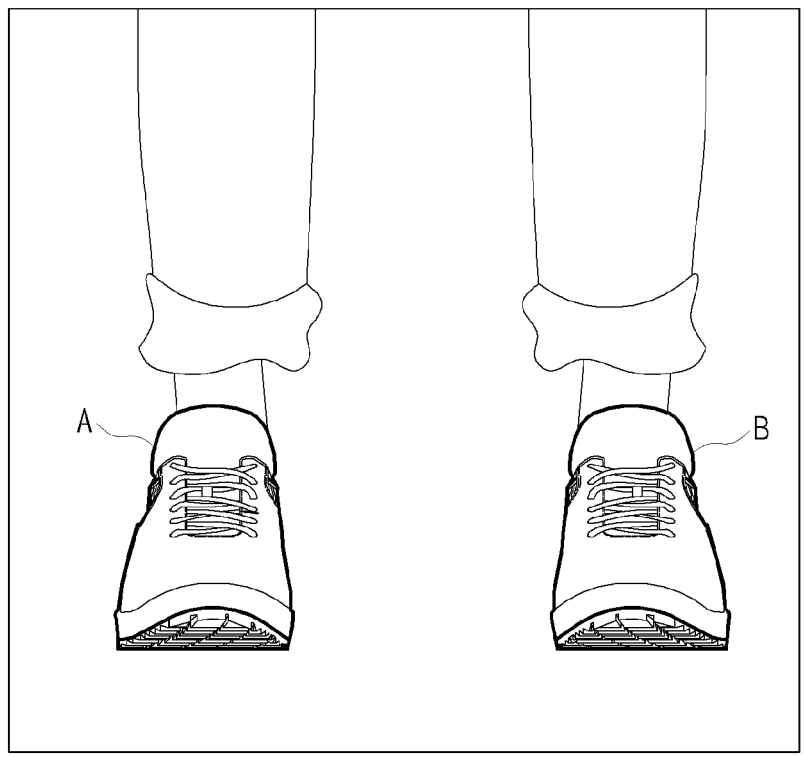
FIG. 4 is a view illustrating a result of searching a matching region.
Figure 5:
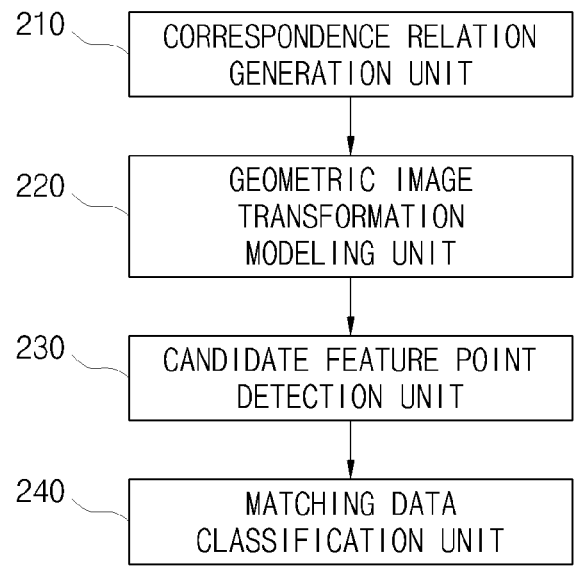
FIG. 5 is a view illustrating a matching information detection structure.
Figure 6:
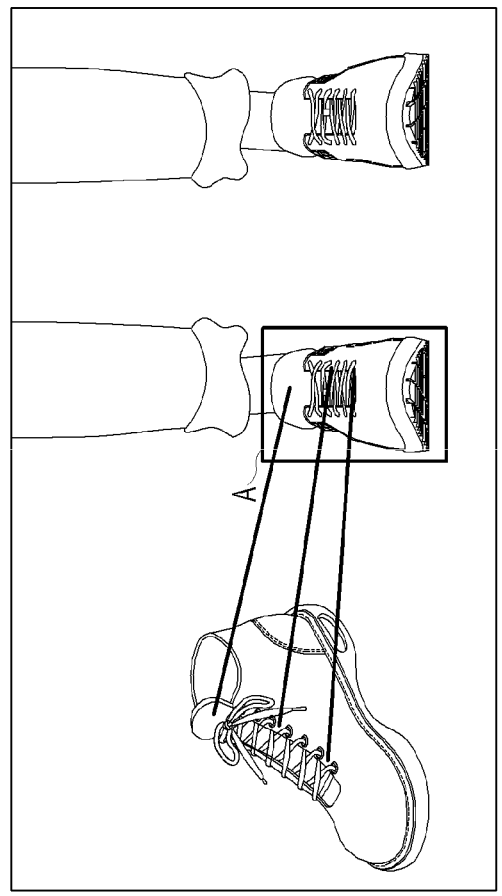
FIG. 6 is a view illustrating a method of extracting a matching pair between a comparison image and a matching region.
Figure 7:
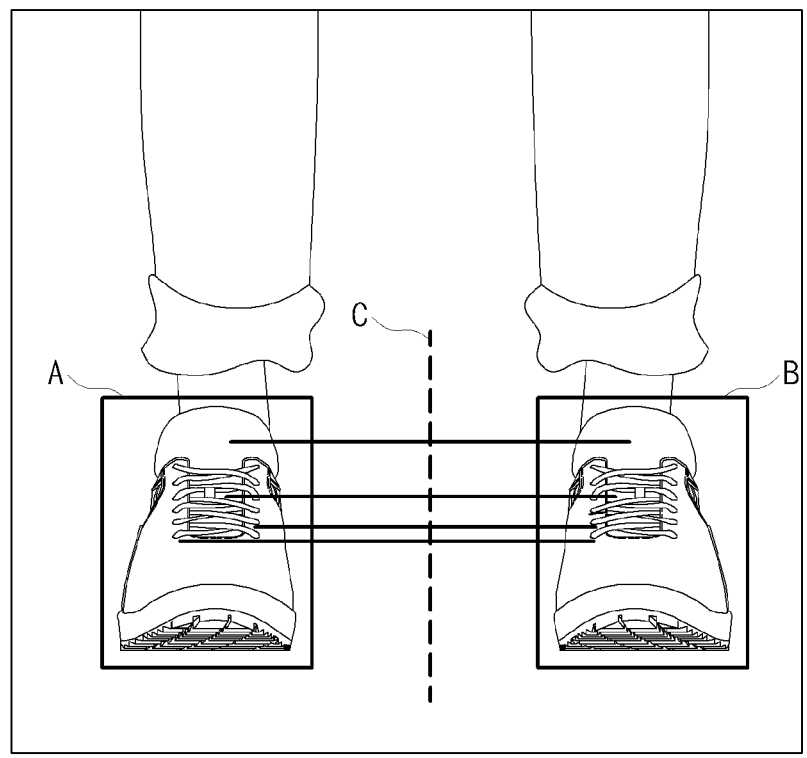
FIG. 7 is a view illustrating a self matching to a similar region in an image.
Figure 8:
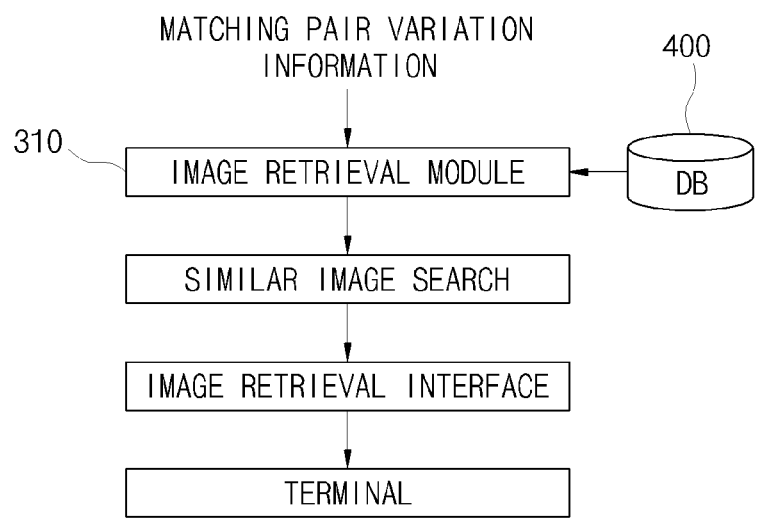
FIG. 8 is a view illustrating an image retrieval service using smart equipment.

Hereinafter, a shoe image retrieval apparatus using a matching pair according to an embodiment of the present invention will be described with reference to FIGS. 1 to 8. FIG. 1 is a view illustrating a shoe image retrieval apparatus using a matching pair according to an embodiment of the present invention, FIG. 2 is a view illustrating a method of searching a matching region, FIG. 3 is a view illustrating a method of identifying a matching pair region, FIG. 4 is a view illustrating a result of searching a matching region, FIG. 5 is a view illustrating a matching information detection structure, FIG. 6 is a view illustrating a method of extracting a matching pair between a comparison image and a matching region, FIG. 7 is a view illustrating a self matching to a similar region in an image, and FIG. 8 is a view illustrating an image retrieval service using smart equipment.

As shown in FIG. 1, a shoe image retrieval apparatus using a matching pair of the present invention includes a matching region search unit 100; a matching information detection unit 200, and a similar image retrieval unit 300, and when a shoe image is inputted, as a query image, by a user via a terminal, detects geometric image transformation about a matching pair between an inputted shoe image and an image stored in a database (DB) 400, retrieves image information corresponding to the inputted shoe image from the DB 400 based on the detected geometric image transformation, and displaying the retrieved image information on a terminal of a user.

Figure 2:
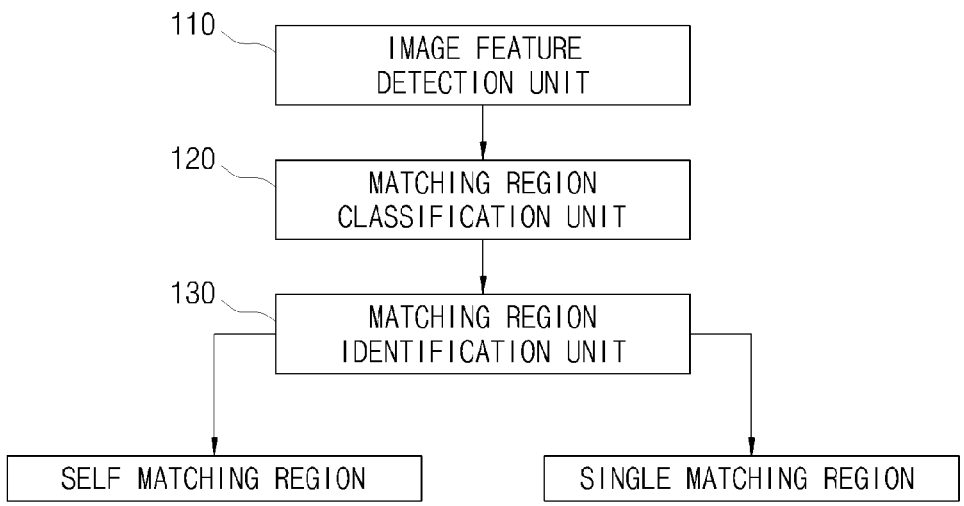
FIG. 2 is a view illustrating a method of searching a matching region.

The matching region search unit 100, as shown in FIG. 2, includes an image feature detection unit 110, a matching region classification unit 120, and a matching region identification unit 130.

When a shoe image is inputted, as a query image, by a user via a terminal, the image feature detection unit 110 detects features invariant to image scaling and rotation, from the inputted shoe image using Scale-Invariant Feature Transform (SIFT) algorithm.

That is, the image feature detection unit 110 extracts Scale-space extrema to detect features, from the inputted shoe image using Scale-Invariant Feature Transform-Laplacian of Gaussian (SIFT-LoG) applied LoG (Laplacian of Gaussian) instead of DoG (Difference of Gaussian).

The matching region classification unit 120 decomposes the detected features by components in a threshold range predetermined according to the geometric property taken from points adjacent to the features, groups the features decomposed by components into a group having a similar component according to a predetermined condition to form a matching region, and classifies the inputted shoe image for each matching region.

The matching region identification unit 130 determines whether there is a similar matching region in the shoe image classified by matching regions and as a result of the determination, separates the shoe image into a self matching region and a single matching region in order to identify a case where a pair of or a plurality of shoes (specific matching region) are included in the shoe image classified by the matching regions.

That is, the matching region identification unit 130 identifies the shoe image classified by the matching regions as the self matching region when there is the similar matching region in the shoe image and as the single matching region when there is not the similar matching region in the shoe image.

For example, when the shoe image is delivered from the matching region classification unit 120, as shown in FIG. 3, the matching region identification unit 130 labels and groups matching regions positioned within a predetermined range from the delivered shoe image in operation S131.

Subsequently, the matching region identification unit 130 performs matching between all groups to determine whether a group having the same region as a specific group is positioned at another position of the shoe image, and when the group having the same region as the specific group is positioned at another position as a result of the determination, recognizes the specific group and the group having the same matching region as the specific group as a similar matching region to identify the shoe image as the self matching region in operation S132.

More specifically, as shown in FIG. 4, the matching region identification unit 130 groups matching regions in the shoe image classified by the matching regions, performs matching between the groups, and determines whether there is a group having the same matching region as a specific group A.

As a result of the determination, when there is a group B having the same matching region as the specific group A, the matching region identification unit 130 recognizes the group B as a similar matching region of the specific group A, identifies the shoe image classified by the matching regions as the self matching region, and identifies positions of the group A and the group B based on an image coordinate system.

Accordingly, the matching region search unit 100 may recognize that the inputted shoe image includes a pair of shoes (matching regions).

The matching information detection unit 200 includes a correspondence relation generation unit 210, a geometric image transformation modeling unit 220, a candidate feature detection unit 230, and a matching data classification unit 240, and determines a matching pair between the shoe image identified as the self matching region or single matching region and the image stored in the DB 400 to generate a correspondence relation therebetween, models the generated correspondence relation with respect to geometric image transformation components, selects a candidate matching pair that meets a predetermined matching condition on the basis of the modeled correspondence relation, and calculates a correlation from the selected candidate matching pair to classify final-matching data.

To this end, as shown in FIG. 6, the correspondence relation generation unit 210 detects matching pairs between a specific matching region A of the shoe image identified as the self matching region and a comparison image stored in the DB 400 and forms correspondence information corresponding to geometric image transformation, using the detected matching pairs.

The detected matching pairs are also used to normalize the formed correspondence information.

When the matching pairs between the specific matching region A of the shoe image identified as the self matching region and the comparison image stored in the DB 400 are detected, as shown in FIG. 7, the correspondence relation generation unit 210 generates a symmetry axis C between the specific matching region A and a matching region B recognized as a similar matching region similar to the specific matching region A and additionally detects matching pairs orthogonal to the generated symmetry axis C.

In addition, when the initial symmetry axis C is generated between the specific matching region A of a shoe region identified as the self matching region and the matching region B recognized as similar to the specific matching region A, the correspondence relation generation unit 210 generates the symmetry axis C corresponding to a vertical axis direction of the shoe image and changes the symmetry axis C according to a correspondence structure such that an euclidean distance between feature pairs detected by the image feature detection unit 110 may be smallest.

The geometric image transformation model unit 220 models both phase related information such as size, rotation, and geometric transformation according to distribution of the matching pairs detected between the specific matching region A of a shoe region identified as the self matching region and image variation information about variation in an image due to brightness, lightning, shadow, etc. of the detected matching pair.

For example, the geometric image transformation modeling unit 220 calculates a mathematical model and a matching coefficient specialized in geometric image transformation from the detected matching pair, using an optimization algorithm such as RANdom SAmple Consensus (RANSAC).

The candidate feature detection unit 230 detects a candidate matching pair among the matching pairs detected based on correspondence information formed by the correspondence generation unit 210 according to a predetermined threshold range of the calculated mathematical model and matching coefficient.

The matching data classification unit 240 finds a one-to-one correspondence pair having a correlation higher than a predetermined value from each one-to-N correspondence pair among correspondence pairs according to a correspondence relation, that is, a correspondence correlation between the candidate matching pairs detected by the candidate feature detection unit 230, normalizes the one-to-one correspondence pair, and determines final-matching data on the basis of a result of the normalization.

As shown in FIG. 8, the similar image retrieval unit 300 includes an image retrieval module 310, and provides an image retrieval service.

For example, when matching pair variation information, that is, the determined final matching data is delivered from the matching information detection unit 200, the image retrieval module 310 retrieves an image similar to the query image (the inputted shoe image) from the DB 400 on the basis of the delivered final-matching data to select a candidate ranking and displays the retrieved similar image on a user's terminal through an image retrieval interface according to the selected candidate ranking.

As described above, according to the present invention, it is possible to detect optimum geometric image transformation from a matching pair between an inputted shoe image and an image stored in the database and simultaneously retrieve a plurality of objects in the inputted shoe image based on the detected geometric image transformation, thereby providing an efficient shoe retrieval service.

Figure 9:
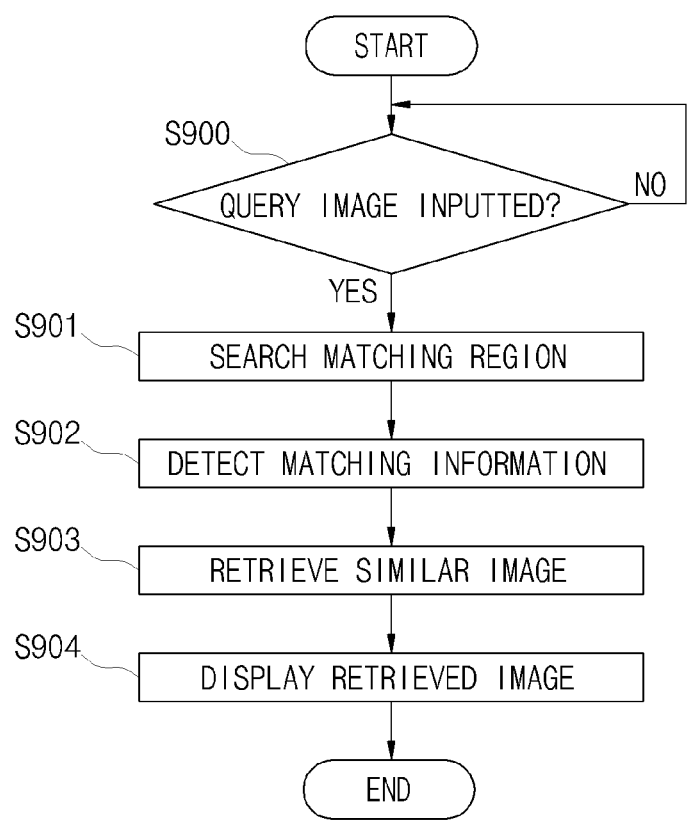
FIG. 9 is a flowchart illustrating a shoe image retrieval method using a matching pair according to an embodiment of the present invention.

The shoe image retrieval apparatus using a matching pair according to an embodiment of the present invention has been described with reference to FIGS. 1 to 8. Hereinafter, a shoe image retrieval method using a matching pair according to an embodiment of the present invention will be described with reference to FIG. 9. FIG. 9 is a flowchart illustrating a shoe image retrieval method using a matching pair according to an embodiment of the present invention.

As shown in FIG. 9, the method includes determining whether a query image, that is, a shoe image is inputted by a user via a terminal in operation S900.

As a result of the determination, when the shoe image is inputted, features that is invariant to image scaling and rotation is detected from the inputted shoe image using Scale-Invariant Feature Transform (SIFT) algorithm.

That is, Scale-space extrema to detect features is extracted from the inputted shoe image using Scale-Invariant Feature Transform-Laplacian of Gaussian (SIFT-LoG) applied LoG (Laplacian of Gaussian) instead of DoG (Difference of Gaussian).

The detected features is decomposed by components in a threshold range that is predetermined according to the geometric property taken from points adjacent to the features, the features decomposed by components is grouped into a group having a similar component according to a predetermined condition to form a matching region, and the inputted shoe image is classified for each matching region.

In order to identify a case where a pair of or a plurality of shoes (specific matching region) are included in the shoe image classified by the matching regions, the shoe image classified by matching regions is separated into a self matching region and a single matching region according to whether there is a similar matching region in the shoe image classified by matching regions.

That is, the shoe image classified by the matching regions is identified as the self matching region when there is the similar matching region in the shoe image and as the single matching region when there is not the similar matching region in the shoe image.

For example, matching regions positioned within a predetermined range from the shoe image classified by the matching regions are labeled and grouped, all groups are matched to determine whether a group having the same region as a specific group is positioned at another position of the shoe image in operation S901, and when the group having the same region as the specific group is positioned at another position as a result of the determination, the specific group and the group having the same matching region as the specific group are recognized as the similar matching region to identify the shoe image as the self matching region.

The method includes detecting matching pairs between the specific matching region of a shoe image identified as the self matching region and a comparison image stored in the DB 400 in operation S902, and correspondence information corresponding to geometric image transformation is formed using the detected matching pair.

That is, the matching pairs are used to form and normalize the correspondence information corresponding to geometric image transformation.

When the matching pairs between the specific matching region of the shoe image identified as the self matching region and the comparison image stored in the DB 400 are detected, a symmetry axis is generated between the specific matching region and a matching region recognized as a similar matching region similar to the specific matching region and matching pairs orthogonal to the generated symmetry axis are additionally detected.

In addition, when the initial symmetry axis is generated between the specific matching region of the shoe region identified as the self matching region and the matching region recognized as the similar matching region, the symmetry axis corresponding to a vertical axis direction of the shoe image is generated and the symmetry axis is changed according to a correspondence structure such that an euclidean distance between the detected feature pairs may be smallest.

Both phase related information such as size, rotation, and geometric transformation according to distribution of the matching pairs detected between the specific matching region of a shoe region identified as the self matching region and image variation information about variation in an image due to brightness, lightning, shadow, etc. of the detected matching pairs are modeled.

For example, a mathematical model and a matching coefficient specialized in geometric image transformation are calculated from the detected matching pair, using an optimization algorithm such as RANdom SAmple Consensus (RANSAC).

A candidate matching pair is detected among the detected matching pairs, according to a predetermined threshold range of the calculated mathematical model and matching coefficient.

A one-to-one correspondence pair having a correlation higher than a predetermined value is found from each one-to-N correspondence pair among correspondence pairs according to a correspondence correlation between the detected candidate matching pairs, the one-to-one correspondence pair is normalized, and final-matching data is determined based on a result of the normalization.

The method includes retrieving an image similar to the query image (the inputted shoe image) from the DB 400 on the basis of the determined final-matching data to select a candidate ranking in operation S903 and displaying the retrieved similar image on a user's terminal through an image retrieval interface according to the selected candidate ranking in operation S904.

According to the present invention, it is possible to detect optimum geometric image transformation from the matching pair between the inputted shoe image and the image stored in the database and simultaneously retrieve a plurality of objects in the inputted shoe image based on the detected geometric image transformation, thereby, as described above, providing an efficient shoe retrieval service.

Figure 10:
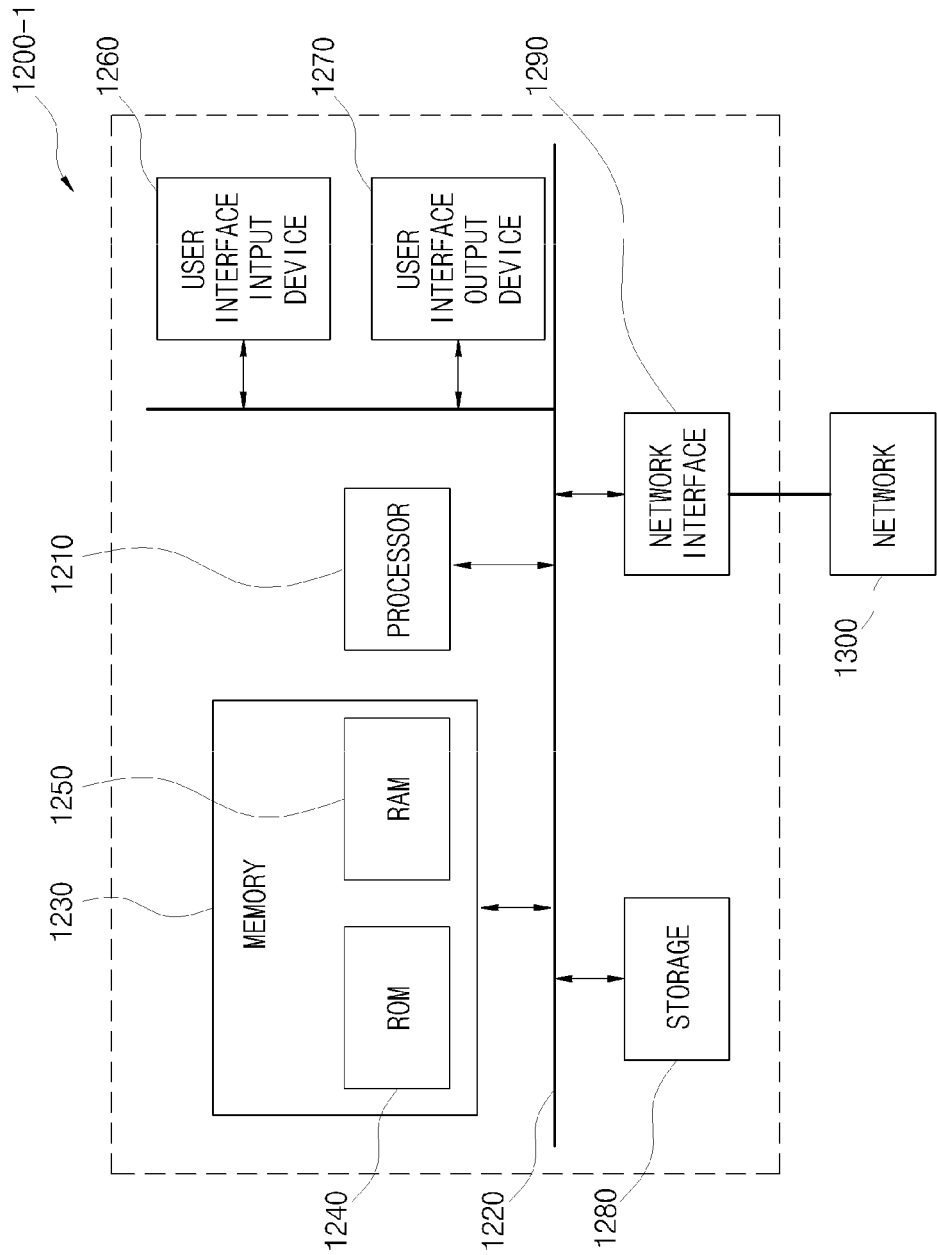
FIG. 10 is a view illustrating a configuration of a computer device in which a method for automatically generating a visual annotation based on a visual language according to an embodiment of the present invention is executed.

A method for automatically generating a visual annotation based on a visual language according to an embodiment of the present invention may be implemented in a computer system, e.g., as a computer readable medium. As shown in FIG. 10, a computer system 1200-1 may include one or more of a processor 1210, a memory 1230, a user input device 1260, a user output device 1270, and a storage 1280, each of which communicates through a bus 1220. The computer system 1200-1 may also include a network interface 1290 that is coupled to a network 1300. The processor 1210 may be a central processing unit (CPU) or a semiconductor device that executes processing instructions stored in the memory 1230 and/or the storage 1280. The memory 1230 and the storage 1280 may include various forms of volatile or non-volatile storage media. For example, the memory may include a read-only memory (ROM) 1240 and a random access memory (RAM) 1250.

Accordingly, a method for automatically generating a visual annotation based on a visual language according to an embodiment of the present invention may be implemented as a computer implemented method or as a non-transitory computer readable medium with computer executable instructions stored thereon. In an embodiment, when executed by the processor, the computer readable instructions may perform a method according to at least one aspect of the invention.

It should be understood that although the present invention has been described above in detail with reference to the accompanying drawings and exemplary embodiments, this is illustrative only and various modifications may be made without departing from the spirit or scope of the invention. Thus, the scope of the present invention is to be determined by the following claims and their equivalents, and shall not be restricted or limited by the foregoing detailed description.

What is claimed is:

1. A shoe image retrieval apparatus using a matching pair comprising:
a matching region search unit configured to extract features from a query image and to search a matching region based on the extracted features;
a matching information detection unit configured to detect a matching pair between the searched matching region and an image stored in a database and to detect geometric image transformation using the detected matching pair; and
a similar image retrieval unit configured to retrieve image information corresponding to the query image from the database based on the detected geometric image transformation,
wherein the matching region search unit comprises:
an image feature detection unit configured to detect features invariant of a geometric property from the query image using Scale-Invariant Feature Transform-Laplacian of Gaussian (SIFT-LoG);
a matching region classification unit configured to decompose the detected features by components in a threshold range predetermined according to the geometric property taken from points adjacent to the detected features, using an image descriptor, to group the decomposed features into a group having a similar component according to a predetermined condition to form one matching region, and to classify the query image for the formed matching region; and
a matching region identification unit configured to identify the classified query image as a self matching region or a single matching region.

2. The shoe image retrieval apparatus of claim 1, wherein the matching region identification unit labels and groups matching regions positioned within a predetermined range from the classified query image, performs matching between all groups to determine whether a group having a substantially same region as a specific group at a first position is positioned at a second position of the query image, and when the group having the substantially same region is positioned at the second position as a result of the determination, and recognizes the specific group and the group having the substantially same region as a similar matching region.

3. The shoe image retrieval apparatus of claim 2, wherein the matching region identification unit identifies the first and second positions of the specific group and the group having the substantially same region based on an image coordinate system.

4. The shoe image retrieval apparatus of claim 2, wherein the matching region identification unit identifies the classified query image as the self matching region when the matching region identification unit recognizes the similar matching region in the classified query image, and identifies the classified query image as the single matching region when the matching region identification unit does not recognize the similar matching region in the classified query image.

5. The shoe image retrieval apparatus of claim 1, wherein the matching information detection unit comprises:
a correspondence relation generation unit configured to determine a matching pair between the query image identified as the self matching region or the single matching region and the image stored in the database to generate a correspondence relation therebetween;
a geometric image transformation modeling unit configured to model the generated correspondence relation with respect to geometric image transformation components;

a candidate feature detection unit configured to select a candidate matching pair that meets a predetermined matching condition based on the modeled correspondence relation; and a matching data classification unit configured to calculate a correlation from the selected candidate matching pair to classify final matching data.

6. The shoe image retrieval apparatus of claim 5, wherein the correspondence relation generation unit detects matching pairs between a specific matching region of the query image identified as the self matching region or the single matching region and a comparison image stored in the database,. and forms correspondence information corresponding to geometric image transformation, using the detected matching pairs.

7. The shoe image retrieval apparatus of claim 6, wherein when a matching pair between the specific matching region of the query image and the comparison image stored in the database is detected, the correspondence relation generation unit generates a symmetry axis between the specific matching region and a matching region recognized as a similar matching region similar to the specific matching region and additionally detects matching pairs orthogonal to the generated symmetry axis.

8. The shoe image retrieval apparatus of claim 6, wherein the geometric image transformation modeling unit models phase related information and geometric image transformation on the matching pairs detected between the specific matching region of the query image identified as the self matching region or the single matching region and the comparison image stored in the database to calculate a mathematical model and a matching coefficient specialized in geometric image transformation.

9. The shoe image retrieval apparatus of claim 8, wherein the candidate feature detection unit detects candidate matching pairs among the matching pairs detected by the correspondence relation generation unit according to a predetermined threshold range of the calculated mathematical model and matching coefficient.

10. The shoe image retrieval apparatus of claim 9, wherein the matching data classification unit finds a one-to-one correspondence pair having a correlation higher than a predetermined value from each one-to-N correspondence pair among correspondence pairs according to a correspondence correlation between the candidate matching pairs detected by the candidate feature detection unit, normalizes the one-to-one correspondence pair, and determines final-matching data based on a result of the normalization.

11. The shoe image retrieval apparatus of claim 10, wherein the similar image retrieval unit retrieves an image similar to the query image from the database based on the final-matching data determined by the matching information detection unit to select a candidate ranking and displays the retrieved similar image on a user's terminal through an image retrieval interface according to the selected candidate ranking.

12. A shoe image retrieval method using a matching pair comprising:
extracting features from a query image and searching a matching region based on the extracted features;
detecting a matching pair between the searched matching region and an image stored in a database and detecting geometric image transformation using the detected matching pair; and
retrieving image information corresponding to the query image from the database based on the detected geometric image transformation, wherein searching the matching region comprises:
detecting features unchanged irrespective of a geometric property from the query image using Scale-Invariant Feature Transform-Laplacian of Gaussian (SIFT-LoG);
decomposing the detected features by components in a threshold range predetermined according to the geometric property taken from points adjacent to the detected features, using an image descriptor, groups the decomposed features into a group having a similar component according to a predetermined condition to form one matching region, and classifying the query image for the formed matching region; and
identifying the classified query image as a self matching region or a single matching region.

13. The shoe image retrieval method of claim 12, wherein detecting the geometric image transformation comprises:
determining a matching pair between the query image identified as the self matching region or the single matching region and the image stored in the database and generating a correspondence relation therebetween;
modeling the generated correspondence relation with respect to geometric image transformation components;
selecting a candidate matching pair that meets a predetermined matching condition based on the modeled correspondence relation; and
calculating a correlation from the selected candidate matching pair to classify final matching data.

14. The shoe image retrieval method of claim 13, wherein generating the correspondence relation comprises:
detecting matching pairs between a specific matching region of the query image identified as the self matching region or single matching region and a comparison image stored in the database; and
forming correspondence information corresponding to geometric image transformation using the detected matching pairs,
wherein detecting the matching pairs comprises generating a symmetry axis between the specific matching region and a matching region recognized as a similar matching region similar to the specific matching region and additionally detecting matching pairs orthogonal to the generated symmetry axis.

15. The shoe image retrieval method of claim 14, wherein modeling the generated correspondence relation comprises modeling phase related information and geometric image transformation on the matching pairs detected between the specific matching region of the query image identified as the self matching region or the single matching region and the comparison image stored in the database to calculate a mathematical model and a coefficient specialized in geometric image transformation.

16. The shoe image retrieval method of claim 15, wherein selecting the candidate matching pair comprises detecting candidate matching pairs among the detected matching pairs according to a predetermined threshold range of the calculated mathematical model and matching coefficient.

17. The shoe image retrieval method of claim 16, wherein classifying the final matching data comprises:
finding one-to-one correspondence pairs each having a correlation higher than a predetermined value from each one-to-N correspondence pair among correspondence pairs according to a correspondence correlation between the detected candidate matching pairs and normalizing the one-to-one correspondence pairs; and
determining the final-matching data based on a result of the normalization.

18. The shoe image retrieval method of claim 17, wherein retrieving the image information comprises:
- retrieving an image similar to the query image from the database based on the determined final-matching data to select a candidate ranking; and
- displaying the retrieved similar image on a user's terminal through an image retrieval interface according to the selected candidate ranking.

19. A shoe image retrieval apparatus using a matching pair, the apparatus comprising:
- a matching region search unit configured to extract features from a query image and to search a matching region based on the extracted features,
- wherein the matching region search unit comprises:
  - an image feature detection unit configured to detect features that are invariant of a geometric property from the query image using Scale-Invariant Feature Transform-Laplacian of Gaussian (SIFT-LoG), and to generate an image descriptor;
  - a matching region classification unit configured to decompose the detected features by components in a threshold range, the threshold range being predetermined according to the geometric property taken from points adjacent to the detected features, using the generated image descriptor, to group the decomposed features into a group having a similar component according to a predetermined condition to form one matching region, and to classify the query image for the formed matching region; and
  - a matching region identification unit configured to identify the classified query image as a self matching region or a single matching region.

* * * * *